(12) United States Patent
Campbell et al.

(10) Patent No.: US 11,085,708 B2
(45) Date of Patent: Aug. 10, 2021

(54) METHOD FOR IMPROVED THERMAL PERFORMANCE OF COLD PLATES AND HEAT SINKS

(71) Applicant: International Business Machines Corporation, Armonk, NY (US)

(72) Inventors: Eric J. Campbell, Rochester, MN (US); Phillip V. Mann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 15/337,959

(22) Filed: Oct. 28, 2016

(65) Prior Publication Data

US 2018/0120037 A1    May 3, 2018

(51) Int. Cl.
| | |
|---|---|
| *F28F 3/02* | (2006.01) |
| *F28F 21/08* | (2006.01) |
| *F28F 13/00* | (2006.01) |
| *B32B 5/00* | (2006.01) |
| *F28F 21/06* | (2006.01) |
| *F28F 13/18* | (2006.01) |

(52) U.S. Cl.
CPC ............... *F28F 3/02* (2013.01); *B32B 5/00* (2013.01); *F28F 3/022* (2013.01); *F28F 13/003* (2013.01); *F28F 13/185* (2013.01); *F28F 21/067* (2013.01); *F28F 21/081* (2013.01); *F28F 21/089* (2013.01); *F28F 21/085* (2013.01); *F28F 21/087* (2013.01); *F28F 2215/04* (2013.01); *F28F 2215/06* (2013.01); *F28F 2215/10* (2013.01); *F28F 2245/06* (2013.01); *F28F 2255/06* (2013.01); *F28F 2255/146* (2013.01)

(58) Field of Classification Search
CPC .. F28F 3/02; F28F 3/022; F28F 13/003; F28F 13/185; F28F 21/067; F28F 21/081
See application file for complete search history.

(56) References Cited

U.S. PATENT DOCUMENTS

| | | |
|---|---|---|
| 4,871,623 A | 10/1989 | Hoopman et al. |
| 5,070,606 A | 12/1991 | Hoopman et al. |
| (Continued) | | |

OTHER PUBLICATIONS

Photopolymer—Wikipedia, Oct. 4, 2015 https://en.wikipedia.org/wiki/Photopolymer https://web.archive.org/web/20151004194316/https://en.wikipedia.org/wiki/Photopolymer.*

(Continued)

*Primary Examiner* — Jon T. Schermerhorn, Jr.
(74) *Attorney, Agent, or Firm* — Patterson + Sheridan, LLP

(57) ABSTRACT

A heat exchange apparatus, and method of forming the apparatus, are disclosed. The apparatus includes a thermally conductive substrate with a metal microlattice structure adhered to the thermally conductive substrate and in thermal communication with the thermally conductive substrate, the metal microlattice structure comprising a region containing an electroless metal. A method of making the apparatus includes forming a polymer lattice, applying the polymer lattice to a thermally conductive substrate, forming an electroless plated metal layer on the polymer lattice, forming an electroplated metal layer on the electroless metal layer, and forming a metal microlattice of the electroless metal layer and the electroplated metal layer.

15 Claims, 5 Drawing Sheets

(56) References Cited

U.S. PATENT DOCUMENTS

| | | | |
|---|---|---|---|
| 5,249,358 | A | 10/1993 | Tousignant et al. |
| 5,317,805 | A | 6/1994 | Hoopman et al. |
| 5,527,588 | A | 6/1996 | Camarda et al. |
| 7,000,684 | B2 | 2/2006 | Kenny et al. |
| 8,453,717 | B1* | 6/2013 | Roper .................. F28F 7/02 165/80.4 |
| 2004/0112571 | A1 | 6/2004 | Kenny et al. |
| 2004/0206477 | A1 | 10/2004 | Kenny et al. |
| 2013/0143060 | A1* | 6/2013 | Jacobsen ............. B29C 71/02 428/594 |

OTHER PUBLICATIONS

Maloney et al., "Microlattices as architected thin films: Analysis of mechanical properties and high strain elastic recovery," Apl Materials 1, 022106 (2013).

* cited by examiner

METHOD FOR IMPROVED THERMAL PERFORMANCE OF COLD PLATES AND HEAT SINKS

BACKGROUND

Apparatus and methods described herein relate to heat-exchange equipment, specifically ultra-high surface area metal structure for use in heating and cooling applications.

SUMMARY

Embodiments described herein provide a heat-exchange apparatus that includes a thermally conductive substrate with a metal microlattice structure attached to the thermally conductive substrate and in thermal communication with the thermally conductive substrate, the metal microlattice structure comprising a region containing an electroless metal.

Other embodiments described herein provide a method of forming a heat exchange apparatus, the method including forming a polymer lattice, applying the polymer lattice to a thermally conductive substrate, forming an electroless plated metal layer on the polymer lattice, forming an electroplated metal layer on the electroless metal layer, and forming a metal microlattice of the electroless metal layer and the electroplated metal layer.

DETAILED DESCRIPTION

Figure 1A:
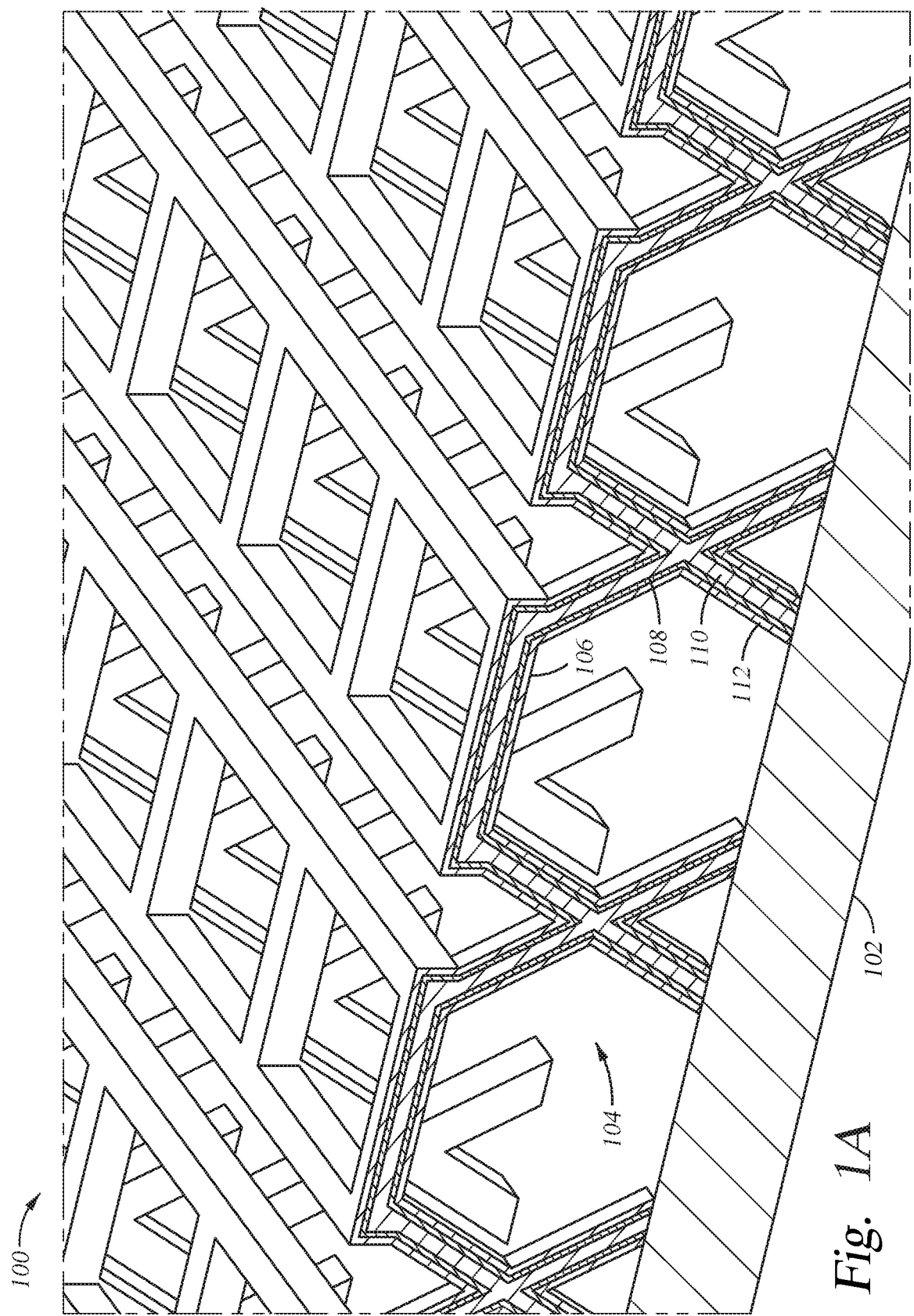
FIG. 1A is a perspective cross-sectional view of a heat-exchange apparatus according to one embodiment.

FIG. 1A is a perspective cross-sectional view of a heat-exchange apparatus 100 according to one embodiment. The heat-exchange apparatus 100 includes a thermally conductive substrate 102 that may be metal or may include thermally conductive components that are metal. The heat-exchange apparatus 100 also includes a metal, or metal-containing, microlattice structure 104 that is attached to the thermally conductive substrate 102 and in thermal communication with the thermally conductive substrate 102. The metal microlattice structure 104 may be a continuous or semi-continuous microlattice of hollow or solid metal tubes, fins, or other shapes. Each metal structure, hollow or solid, has regions of different composition, and may have two or more different metals, such as nickel and copper.

The metal structures may include a microlattice of regularly-spaced, uniformly-oriented metal spans 106 that provide a high surface area thermally conductive mass for efficient heat exchange. Heat input to the thermally conductive substrate is conducted into the microlattice and efficiently radiated away. The microlattice members may have spacing as small as 50 μm, typically 100 μm up to about 5 mm, which may vary within a single apparatus. The members may have transverse dimension, or thickness, that is less than 0.5 mm, for example between 1 μm and 200 μm, and may be solid or hollow. Hollow members may have wall thickness of 1 μm to 100 μm. Solid microlattice members may have a core with one or more layers over the core. The layers may each be 100 μm thick or less, and multiple layers may be used. The core, and each of the layers, may be different metals, although alternating layer structures (A-B-A-B) may also be used. Thus, in one embodiment, the core contains copper and a layer contains nickel. In another embodiment, however, the microlattice has two, three, or more layers that use the same metal, such as copper.

The embodiment of FIG. 1A shows a core 108, an inner layer 110, and an outer layer 112. Thus, the core 108 of the microlattice 104 may be disposed between an inner layer 110 and an outer layer 112. In such cases, the inner and outer layers 110 and 112 may be coatings applied to the interior and exterior of the core 108, respectively. In other embodiments, the microlattice may be hollow, with the inner layer 110, outer layer 112, and a void where the core 108 is currently shown. In other embodiments, the core 108 may be polymer, while the inner layer 110 and outer layer 112 are each metal or metal-containing. In still other embodiments, the microlattice 104 may have an outer layer, such as the outer layer 112, filled with a core material such as the core 108, with no inner layer covering an interior surface of the core 108.

Figure 1B:
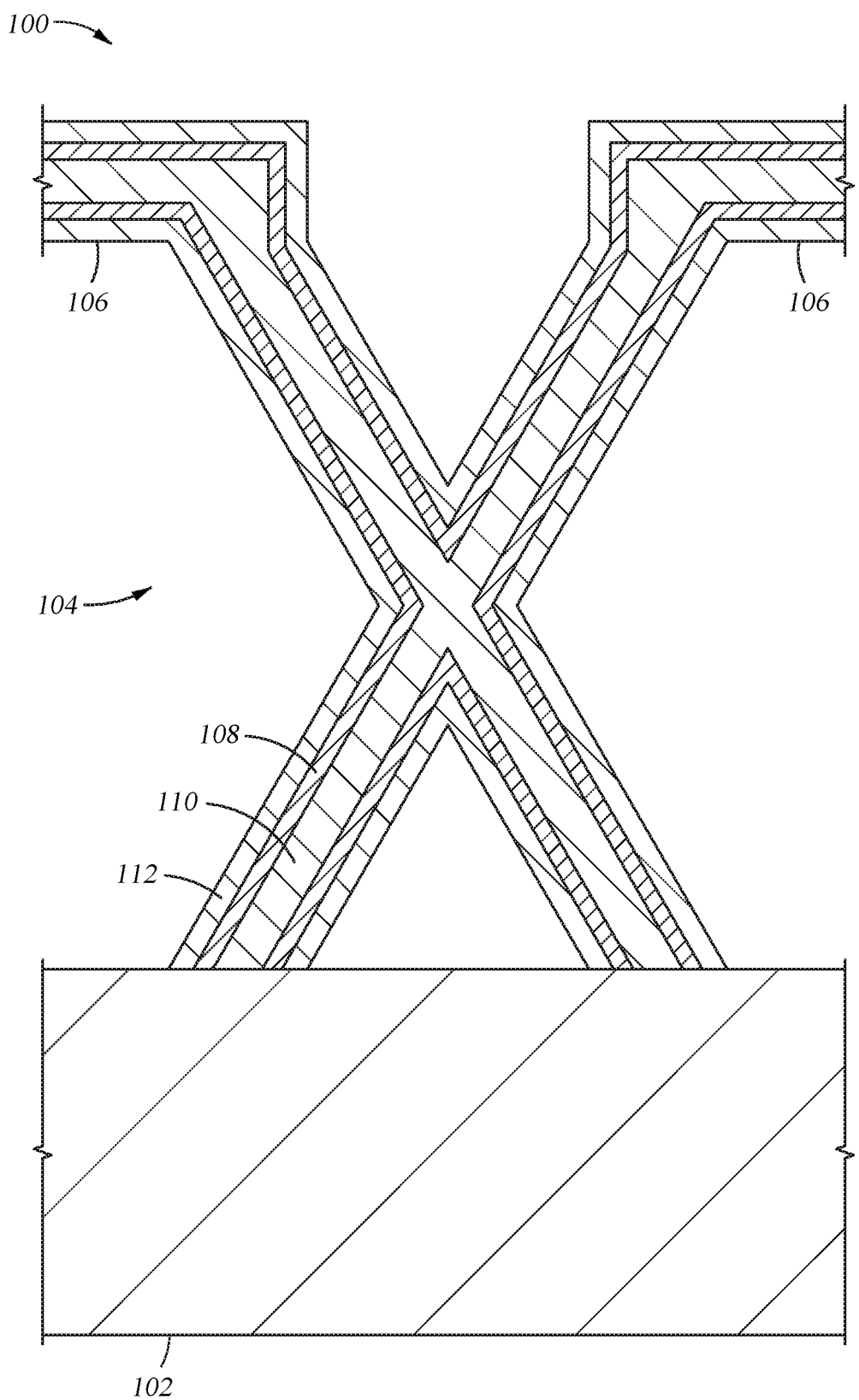
FIG. 1B is a side view of the cross-section of FIG. 1A.

Each microlattice member is attached to the thermally conductive substrate, either directly or by another microlattice member such that there is no significant change in physical properties from member to member. Some microlattice members are connected directly to the conductive substrate while other microlattice members are connected only to microlattice members. FIG. 1B is a side view of the cross-section of FIG. 1A. Each layer, for example the layers 108, 110, and 112, of the microlattice, contacts the conductive substrate 102 to provide thermal communication with the substrate for each layer.

The microlattice array 104 may have any shape. In the embodiment of FIGS. 1A and 1B, the microlattice array has the shape of rows of "X" shape bodies connected by spans in a square pattern that connect the tops of the "X" shaped bodies. Other embodiments may be just the "X" shape bodies without the spans, simple columns extending perpendicular to the substrate surface, or slanted columns extending at an angle with the substrate surface. Other embodiments may feature perpendicular columns connected at their tops by spans, or connected at mid-points thereof to form "H" shapes. The pattern of the microlattice array is selected and determined by the patterning process, described further below.

Figure 1C:
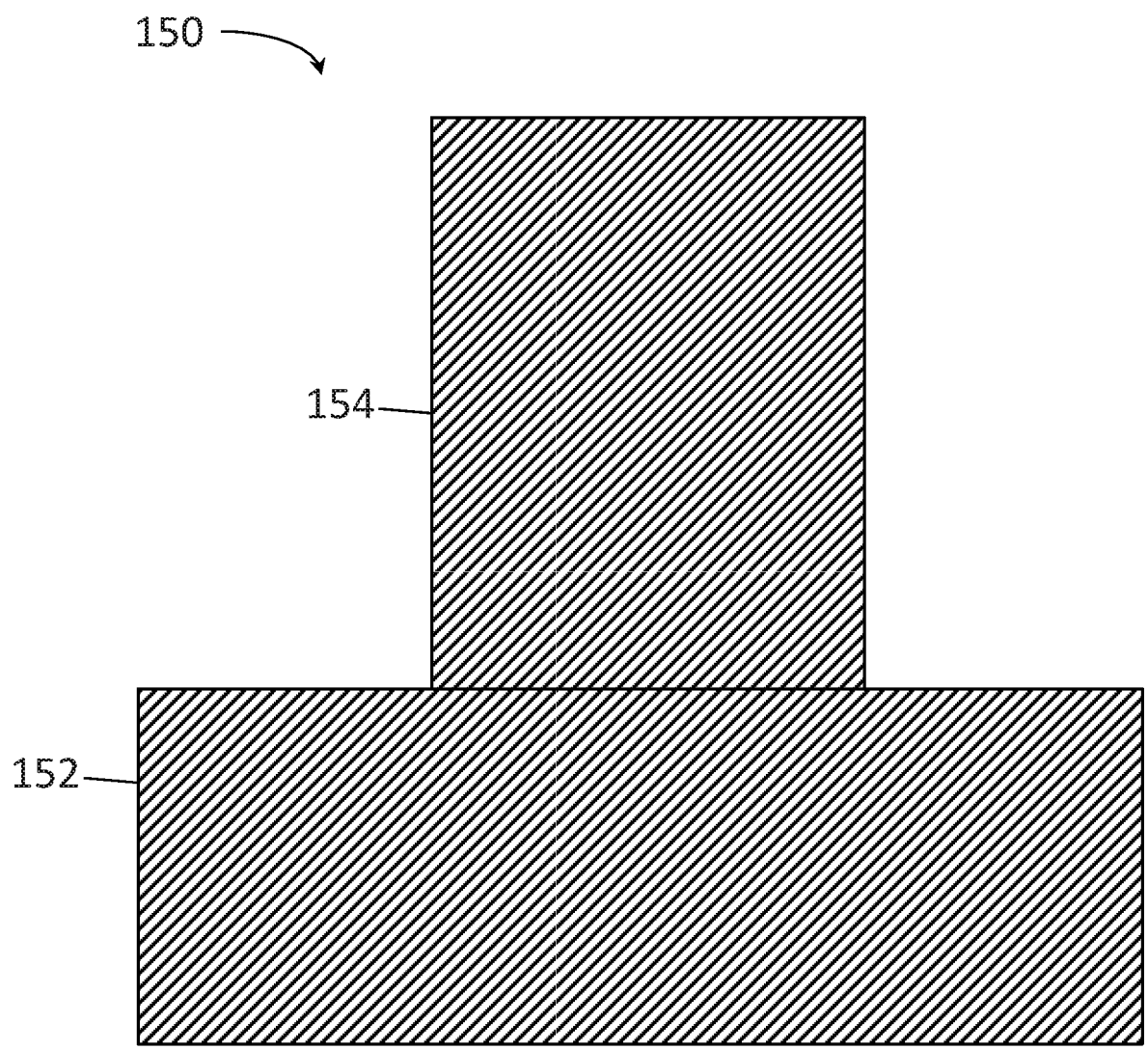
FIG. 1C is a side view of a heat-exchange apparatus according to another embodiment.

FIG. 1C is a side view of a heat-exchange apparatus 150 according to another embodiment. The apparatus 150 includes a thermally conductive substrate 152, which may be the same as the thermally conductive substrate 102 of FIG. 1A, and a plurality of fins 154 projecting from the thermally conductive substrate 152. Although the internal structure is not shown, each of the fins 154 has an internal structure that is the same as the members of the microlattice 104 of FIG. 1A, including the layers 108, 110, and 112, and the variations thereof described above.

The fins 154 are shown as simple rectangular projections perpendicular to the surface of the thermally conductive substrate 152, but the fins 154 may have any desired shape. For example, the fins 154 may be angled or curved. For example, each of the fins 154 may be L-shaped (i.e., when viewed in cross-section along a plane substantially parallel to the surface of the thermally conductive substrate), U-shaped, Z-shaped, wavy, or may have any other shape. In addition, the each of the fins 154 may be non-perpendicular to the surface of the thermally conductive substrate 152, and each of the fins 154 may be angled or curved when viewed in a direction parallel to the surface of the thermally conductive substrate 152. Additionally the fins 154 may have non-uniform shapes in which a first plurality of fins has a first shape and a second plurality of fins has a second shape different from the first shape. The first plurality of fins may be grouped together on the thermally conductive substrate 152, and the second plurality of fins may also be grouped together on the thermally conductive substrate 152, or the first and second plurality of fins may be dispersed or interspersed individually, or in groups.

The fins 154 are also shown as the same material as the thermally conductive substrate 152, although as described above, the surface of the fins 154 visible in FIG. 1C is an external coating that is the same material as the thermally conductive substrate 152, while an internal portion of the fins 154 may be a different material.

In other embodiments, the microlattice may include planes substantially parallel to the surface of the thermally conductive substrate and supported by columns extending from the surface. The planes may have any desired configuration, and may be a uniform elevation above the surface or a varying elevation above the surface.

The members of the microlattice 104, and all microlattice embodiments described herein, generally have a region containing an electroless metal. As will be further described below, at least one portion of the microlattice is formed by an electroless plating process which will form an electroless metal in impurity region. Each member or span of the microlattices described herein includes a portion of the region, so each member or span has a region that includes an electroless metal.

Figure 2:
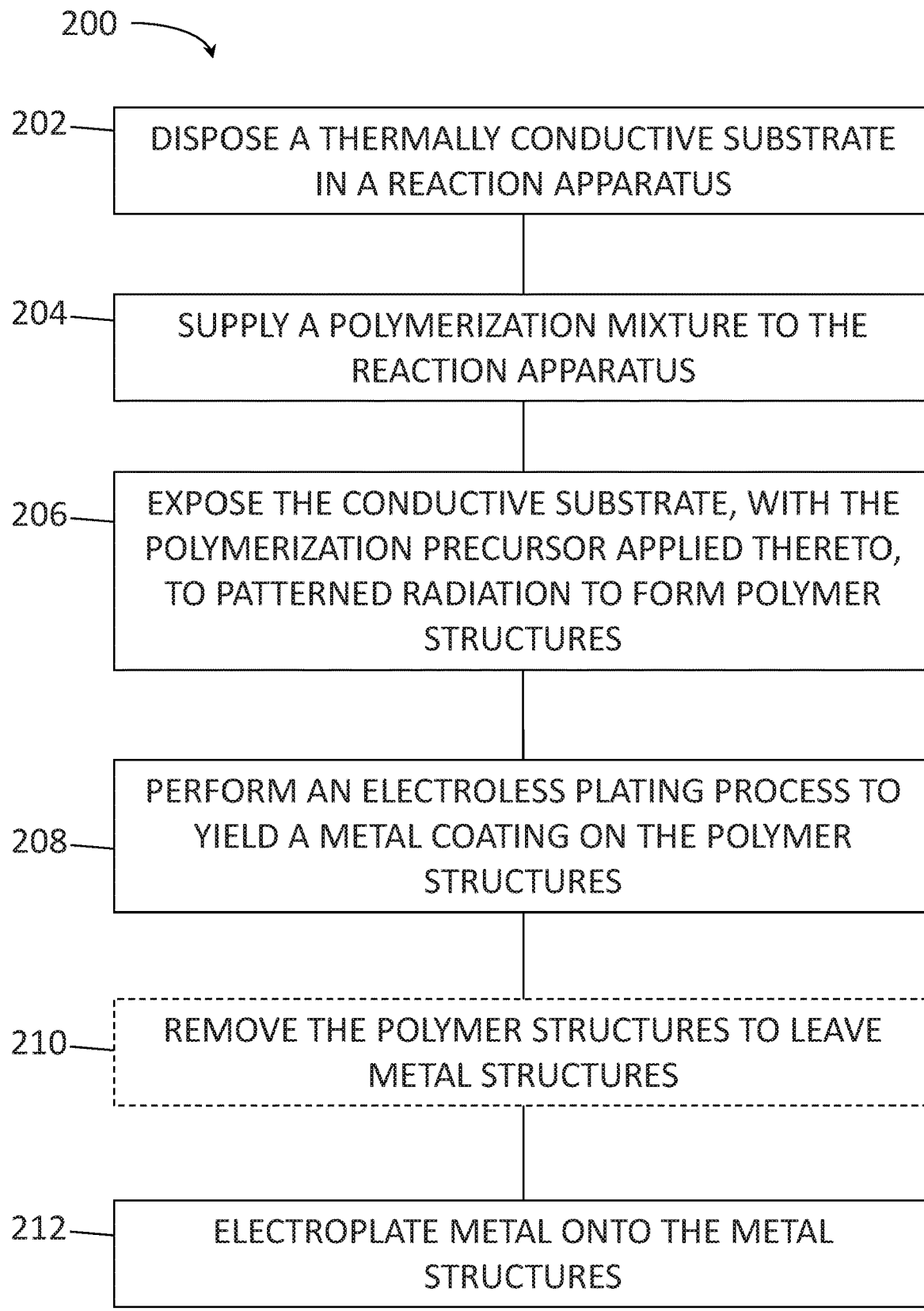
FIG. 2 is a flow diagram summarizing a method according to another embodiment.

FIG. 2 is a flow diagram summarizing a method 200 according to another embodiment. The method 200 may be used to form the heat-exchange apparatus 100 of FIGS. 1A and 1B. In the method 200, a template is formed using a polymeric material, the template having shape and pattern of the microlattice array to be subsequently formed using the template. The template is plated with metal using an electroless plating process to form a metal coating over the template. The polymeric template is then removed, and metal is electroplated over the remaining metal coating. In the method 200, a thermally conductive substrate is subjected to a polymerization process, an electroless plating process, and an electroplating process. At 202, the substrate is disposed in a reaction apparatus. The apparatus is generally suited for performing mild chemical reactions such as polymerization reactions in liquid, gas, or mixed phase, and may have deposition resistant surfaces for contacting reaction mixtures. The reaction apparatus may be stirred or mixed in another way, and may be provided with an inert vapor space. The reaction apparatus may be a vessel, tank, tray or other apparatus capable of supporting a substrate and contacting the substrate with a reaction mixture in liquid, gas, or mixed phase.

A polymerization mixture is supplied to the reaction apparatus at 204. The polymerization mixture may be a gas mixture or a liquid mixture, or a mixed phase mixture. The polymerization mixture may include a catalyst. The polymerization mixture is flowed to the reaction apparatus and may fill the apparatus. Alternately, the polymerization mixture may be provided to a volume less than the volume of the apparatus, so that the apparatus is not filled. The conductive substrate is supported in the apparatus for contacting the polymerization mixture by immersion in the polymerization mixture or by surface contact with the polymerization mixture. In one case, the polymerization mixture flows through a vessel in which the conductive substrate is supported. In another case, the polymerization mixture flows across a surface of the conductive substrate. The polymerization mixture forms a coating on the conductive substrate that may be a polymer or a polymerization precursor.

At 206, the conductive substrate, with the polymerization precursor applied thereto, is exposed to patterned radiation in the presence of the polymerization mixture. The patterned radiation catalyzes a polymerization reaction in irradiated areas leading to growth of a patterned polymer on the conductive substrate. The polymerization mixture may include a photoinitiator that activates the polymerization reaction when exposed to the radiation. Commonly used photopolymerization systems include, but are not limited to, styrenics, vinyl ethers, N-vinyl carbazoles, lactones, lactams, and cyclic ethers, acetals, and siloxanes. Photoinitiators used in such systems may include iodonium, sulfonium, and pryidinium salts, benzophenones, xanthones, quinones, benzoin ethers, acetophenones, benzoyl oximes, and acylphosphines. Oligomers such as epoxides, urethanes, polyethers, and polyesters, functionalized with acrylate groups, may be photopolymerized. Acrylated epoxies are commonly used to coat metallic substrates, and may be useful in forming photopatterned coatings on a conductive substrate. In some cases, negative photoresist systems such as SU-8 can also be used to form a patterned polymer. SU-8 requires post-exposure bake to cure the exposed resin.

The patterned radiation may be monochromatic or polychromatic, and may be directional radiation or a diffuse radiation field. The radiation may be patterned using a mask to block portions of the radiation. Masking is typically used to form a 2-dimensional radiation pattern that is applied to the laterally-extending surface of the polymer coating. The patterned radiation may also be produced using optical methods. For example, relatively coherent radiation can be directed toward the polymer coating at different angles to pattern top and side surfaces of the polymer coating, or to pattern the top surface of the polymer coating at different angles. For example, portions of the patterned radiation may be relatively coherent radiation directed to the surface of the polymer coating in substantially perpendicular orientation while other portion may be relatively coherent radiation directed to the surface of the polymer coating at oblique angles. Further, relatively coherent radiation may be caused to interfere at the surface of the polymer coating to form a pattern of high and low intensity radiation at the surface of the polymer coating.

The polymerization reaction fixes monomers from the coating to the conductive substrate in areas irradiated by reaction-activating radiation. Nucleation sites form on the surface of the conductive substrate in the irradiated areas. If the patterned radiation is formed by a mask at dimensions much larger than the wavelength of the radiation, the patterned radiation will feature irradiated areas separated by areas with essentially no radiation. In such cases, no reaction occurs in the non-irradiated areas, and the surface of the conductive substrate remains exposed in those areas.

If the patterned radiation is formed through interference or diffractive means, the patterned radiation may consist of high and low intensity radiation areas. Some minimal polymerization may occur in areas of the conductive substrate irradiated by low intensity radiation in the radiation pattern. In such cases, the patterned coating may cover the entire surface of the conductive substrate exposed to the polymerization mixture at varying thicknesses. In such cases, an optional differential removal may be performed to expose the areas of the conductive substrate in the low intensity radiation regions. Removal may be by brief exposure to solvents or reactive gases such as oxygen containing gases. Oxygen plasma exposure may be used in some cases. Solvents that may be used include hydrocarbon solvents, including for example hot oil, alcohols, ketones such as acetone and methyl-ethyl ketone, dimethylsulfoxide and other solvents suitable for polymeric materials. A plurality of polymer structures is left on the conductive substrate separated by exposed areas of the surface of the conductive substrate.

In some cases, the patterning may be performed in cycles. The polymerization precursor may be exposed to a first patterned radiation to form a first patterned polymer coating, which may be rinsed, washed, and/or partially removed according to the needs of specific embodiments. Polymerization precursor may then be applied to the first patterned polymer coating and exposed to a second patterned radiation, which may be the same as, or different from, the first patterned radiation, to form a second patterned polymer coating, which may again be rinsed, washed, and/or partially removed. Any number of cycles may be performed to produce the final patterned polymer coating.

At 208, an electroless plating process is performed on the substrate to yield a metal coating on the exposed areas of the surface of the conductive substrate and the polymer structures. The electroless plating process may be performed using any convenient metal system. When the conductive substrate is metal, the metal coating may be the same metal as the conductive substrate, or a different metal. In many instances, copper and/or nickel are used, typically as alloys with low amounts of phosphorus or boron.

The conductive substrate is immersed in an electrolyte solution that is maintained at a pH which results in metal plating out of the solution onto the substrate and polymer surfaces. Well-known electroless nickel plating processes typically involves exposing the substrate to be plated to a plating solution of nickel salts, such as nickel chloride or sulfate, and hypophosphate salts, such as ammonium or sodium hypophosphite. Appropriate pH is maintained by use of acids, buffers, moderators, and the like, and appropriate temperature is maintained. Note that temperature of the plating bath should remain well below softening temperature of the polymer in order to preserve the template pattern during the plating process. The substrate with the polymer microlattice is exposed to the plating solution to form a layer of nickel over the substrate and the polymer microlattice. The nickel layer is atomically deposited on the thermally conductive substrate and the polymer microlattice to yield a metal phase attached to the conductive substrate and conformally deposited over the polymer structures, which serve as a template for the electroless plating process. Deposition can be prevented in any desired area of the polymer microlattice by masking a portion of the polymer microlattice.

Other metals, such as copper and zinc, can be electrolessly plated onto the polymer microlattice using suitable reactions. Prior to exposure to the plating bath, the polymer may be prepared or cleaned by acid wash (e.g. chromic, sulfuric, nitric, or other strong acid). The metal coating may be deposited to any desired thickness limited by exposure time and metal concentration in the electrolyte solution. For example, under appropriate conditions, performing the nickel plating reaction for an hour yields an amorphous or polycrystalline nickel film with some phosphorus that is 5-10 μm thick. Typical thickness of the metal coating applied to the polymer template is 1-100 μm. Thermal conductivity of the metal film can be enhanced by heat treatment or mild annealing, if desired.

At 210, the polymer structures are optionally removed by exposure to a solvent. The solvent may be organic or inorganic, depending on the type of polymer used for the polymer structures. Organic solvents, for example hydrocarbon solvents such as hot oil, alcohols, and ketones, for example toluene, acetone, or MEK, may be used for most organic polymers. Heat, for example temperatures from 200° F.-400° F., may also be used to soften the polymer structures for any polymers with some degree of thermoplasticity. The solvent may be heated and applied to the polymer structures to speed removal. Application of the solvent may be by flowing across the polymer or by immersing the polymer in the solvent. Alternately, the polymer may be removed by flame processing or oxygen plasma processing, for example by exposing the polymer to an oxygen-containing plasma. Any oxidation of metal surfaces may be remediated by subsequent exposure to hydrogen plasma or hydrogen radical gas according to known methods. Removal of the polymer structures typically leaves the conductive substrate with hollow metal structures extending from the surface of the conductive substrate.

At 212, the hollow metal structures may be filled with metal by electroplating. The conductive substrate with the hollow metal structures is immersed in a plating solution, and a voltage applied to coat the entire surface exposed to the plating solution with metal according to well-known processes. The hollow metal structures can be filled with metal in this manner to produce solid metal structures similar to those described in connection with FIGS. 1A and 1B extending from the surface of the conductive substrate.

The electroplating process may result in deposition of metal on interior and exterior surfaces of the hollow metal structures. Thus, in addition to being filled with metal, the hollow metal structures may also be coated with the metal during the electroplating process. The microlattice shown in FIGS. 1A and 1B may be made in this way, so that the core 108, which is the metal coating formed on the polymeric template by electroless plating, is covered inside and out with electroplated metal layers 110 and 112.

Removal of the polymer structures from the surface of the conductive substrate was described above as optional. If the polymer structures are not removed, the metal-coated polymer structures may be covered by electroplating over the metal coating. In either case, the metal structures extending from the surface of the conductive substrate after performing the above process are atomically integrated with the conductive substrate by virtue of forming the structures through chemical and electroplating processes The final electroplating process is also optional. The electroless plating process may yield a structure with thickness as high as 100 μm, which may be sufficient in many cases for thermal energy transfer.

In an alternate embodiment, the polymeric template may be pre-formed in an environment separate from the thermally conductive substrate and then subsequently applied to the thermally conductive substrate. In such cases, the template may be attached to the substrate, for example by melt adhesion or through chemical adhesion, or the template may be merely positioned on the substrate and temporarily immobilized for subsequent processing. The polymer template may be formed by lithographic patterning of a polymer sheet or film, or by additive processes such as fused deposition modeling, vat polymerization, material jetting, selective laser sintering, CLIP, or patterned CVD, which build the template by depositing atoms according to a defined pattern.

In another alternate embodiment, the polymer structures may be removed after a first electroplating process is performed. Thus, the electroless plating process is performed to produce the metal seed structures coated on the polymer structures, and then a first electroplating process is performed to coat the metal seed structures with a thin metal layer, which may be the same metal as the metal seed structures, or a different metal. After electroplating to a desired thickness, for example 100-500 μm, the electroplating may be paused and the substrate cleaned and dried. The conductive substrate may then be exposed to solvent or dry processing, as described above, to remove the polymer structures leaving relatively thick hollow metal structures of thickness 100 μm to 2,000 μm. The thick hollow metal structures may be used as an effective thermal transfer structure with very high surface area and more structural strength than the metal seed structures themselves, or a second electroplating process may be performed to fill the thick hollow metal structures with metal.

Figure 3:
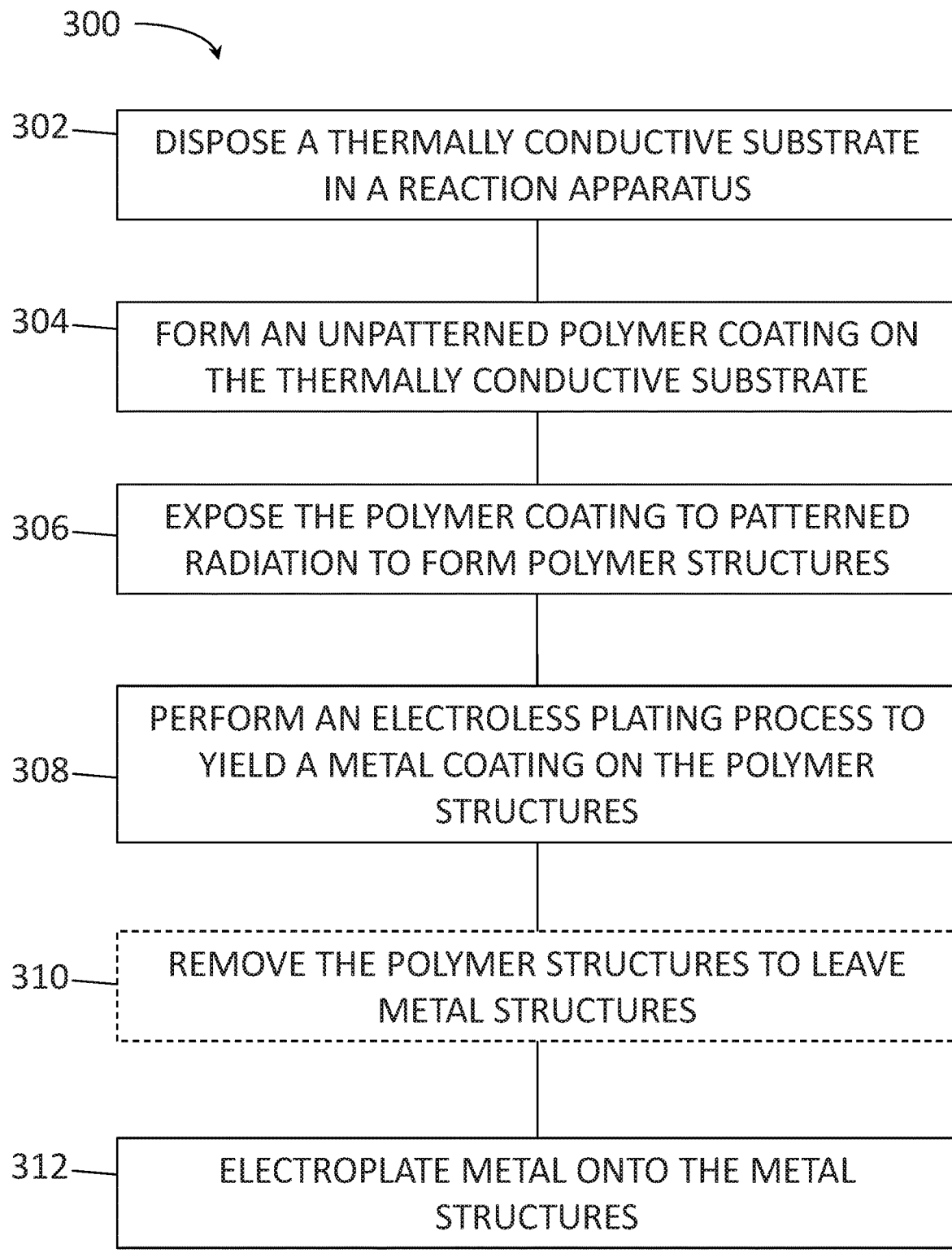
FIG. 3 is a flow diagram summarizing a method according to another embodiment.

FIG. 3 is a flow diagram summarizing a method 300 according to another embodiment. The method 300 may be used to form the structures described in connection with FIG. 1. The method 300 differs from the method 200 in formation of the polymer structures. Whereas, in the method 200, the polymer structures are formed using patterned radiation to form polymer structures from an unpatterned coating of a polymerization mixture, in the method 300, an unpatterned polymer coating is formed on the conductive substrate, and is subsequently patterned to form polymer structures on the surface of the conductive substrate separated by exposed portions of the surface of the conductive substrate.

At 302, the substrate is disposed in a reaction apparatus, which may be substantially similar to the apparatus described above in connection with the method 200.

At 304, an unpatterned polymer coating is formed on at least one surface of the conductive substrate. In the case of post-cure radiant patterning, the unpatterned polymer coating typically includes a UV reactive component to allow the polymer coating to be patterned, and the polymer coating is otherwise selected to withstand exposure to electroless plating solutions. A well-known example of a polymer system that may be used is the SU-8 photoresist system, which is commonly applied by spin-on techniques, cured, exposed to patterned UV radiation, and then baked to develop the pattern. Solvent is then used to remove unexposed material, leaving a patterned polymer material on the substrate. Other polymer systems that may be used for post-cure radiant patterning include Novolac resins, polymethylmethacrylate (PMMA) resins, and polymethylglutarimide (PMGI) resins. The coating is typically applied to a thickness of 1-100 μm to ensure sufficient radiation penetration to the surface of the conductive substrate during patterning.

At 306, the unpatterned polymer coating is exposed to patterned radiation, as described above, to depolymerized areas of the coating, producing a removable material. The patterned radiation may be produced by any of the techniques described above. Depolymerized material is subsequently removed by solvent wash to form a patterned polymer template on the conductive substrate.

In some embodiments, the patterning may be performed in cycles. For example, the polymer coating may be exposed to a first patterned radiation to convert a first portion of the polymer coating into a removable material. A first development, for example solvent treatment, cleaning, and drying, may then be performed to remove the removable material to form a first intermediate polymer coating. The first intermediate polymer coating may then be exposed to a second patterned radiation, which may be the same as, or different from, the first patterned radiation, to convert a second portion of the polymer coating into removable material. A second development may then be performed. Any number of cycles may be performed to produce a desired pattern.

At 308, a conformal electroless metal coating is formed as in 208 above. At 310, the polymer structures are optionally removed, as in 210 above, and at 312, optional electroplating is performed to fill the hollow metal seed structures with a plated metal, as in 212 above.

The shape and configuration of the microlattice may be selected according to the pattern of the polymer template. The pitch and/or density of the microlattice, and the dimensions of the microlattice members and spans, can be adjusted according to the pattern. If patterned radiation is used to resolve a pattern in the polymer template, the radiation pattern may be defined by diffractive means and/or masking. A diffraction or interference pattern may be used to pattern radiation at high density commensurate with the wavelength of the radiation, and masking may be used to pattern radiation at densities below the diffraction limit. In some cases, a polymer template may be made using a first material with a first radiation susceptibility and a second material with a second radiation susceptibility. The first radiation susceptibility can be used to form a first pattern using a first radiation, while the second radiation susceptibility can be used to form a second pattern using a second radiation. The first material may be transparent to the second radiation, and the second material may be transparent to the first radiation so that complex microlattice structures can be made by irradiating the second material with the second radiation according to a desired pattern through the first material and irradiating the first material with the first radiation according to a desired pattern through the second material. Each of the first and second radiation may be patterned by diffraction and/or interference and/or masking.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A heat-exchange apparatus, comprising a thermally conductive substrate with a metal microlattice structure attached to the thermally conductive substrate and in thermal communication with the thermally conductive substrate, the metal microlattice structure comprising a plurality of microlattice members and a plurality of spans integral with the plurality of microlattice members, the microlattice members extending from the thermally conductive substrate to the plurality of spans, wherein the plurality of spans are oriented parallel to the thermally conductive substrate, each of the plurality of microlattice members and at least one of the plurality of spans comprises a solid metal region, the solid metal region comprising:

an outer electroplated metal layer disposed over an electroless metal layer; and an inner electroplated metal layer, wherein the electroless metal layer is disposed over the inner electroplated metal layer, wherein the outer electroplated metal layer, the electroless metal layer, and the inner electroplated metal layer are formed on the thermally conductive substrate.

2. The heat-exchange apparatus of claim 1, wherein the metal microlattice structure comprises at least two metals.

3. The heat-exchange apparatus of claim 1, wherein the inner electroplated metal layer comprises copper.

4. The heat-exchange apparatus of claim 1, wherein the electroless metal layer comprises a composition selected from a group consisting of nickel, tin, zinc, gold, alloys thereof, or combinations thereof.

5. The heat-exchange apparatus of claim 1, wherein the outer electroplated metal layer is an electrolytic copper plating.

6. The heat-exchange apparatus of claim 5, wherein the thermally conductive substrate comprises copper and the copper plating is in thermal communication with the thermally conductive substrate.

7. A heat-exchange apparatus, comprising a thermally conductive substrate with a metal microlattice structure attached to the thermally conductive substrate and in thermal communication with the thermally conductive substrate, the metal microlattice structure comprising a plurality of microlattice members and a plurality of spans integral with the plurality of microlattice members, the microlattice members extending from the thermally conductive substrate to the plurality of spans, wherein the plurality of spans are oriented parallel to the thermally conductive substrate, each of the plurality of microlattice members and at least one of the plurality of spans comprises a solid metal region comprising:

an outer electroplated metal layer disposed over an electroless metal layer; and an inner electroplated metal layer, wherein the electroless metal layer is disposed over the inner electroplated metal layer, wherein the metal microlattice structure comprises a plurality of spans, each span having a wall that contains a portion of the solid metal region, wherein the outer electroplated metal layer, the electroless metal layer, and the inner electroplated metal layer are formed on the thermally conductive substrate.

8. The heat-exchange apparatus of claim 7, wherein the metal microlattice structure comprises at least two metals.

9. The heat-exchange apparatus of claim 7, wherein the metal microlattice structure comprises copper.

10. The heat-exchange apparatus of claim 7, wherein the electroless metal layer comprises a composition selected from a group consisting of nickel, tin, zinc, gold, alloys thereof, or combinations thereof.

11. The heat-exchange apparatus of claim 7, wherein the wall includes the electroless metal layer and the outer electroplated metal layer is an electrolytic copper plating.

12. The heat-exchange apparatus of claim 11, wherein the thermally conductive substrate comprises copper and the copper plating is in thermal communication with the thermally conductive substrate.

13. A heat-exchange apparatus, comprising a thermally conductive substrate with a metal microlattice structure attached to the thermally conductive substrate and in thermal communication with the thermally conductive substrate, the thermally conductive substrate comprising a first metal composition, wherein the metal microlattice structure comprises a plurality of microlattice members and a plurality of spans integral with the plurality of microlattice members, the microlattice members extending from the thermally conductive substrate to the plurality of spans, wherein the plurality of spans are oriented parallel to the thermally conductive substrate, each of the plurality of microlattice members and at least one of the plurality of spans comprises a polymer layer, an electroless metal seed layer comprising a second metal composition different from the first metal composition, and an electrolytic metal layer comprising the first metal composition, and the polymer layer comprises a polymer selected from the group consisting of styrenics, vinyl ethers, N-vinyl carbazoles, lactones, lactams, cyclic ethers, acetals, and siloxanes, and wherein the electroless metal seed layer, the electrolytic metal layer, and the polymer are attached to the thermally conductive substrate.

14. The heat-exchange apparatus of claim 13, wherein the second metal composition comprises a material selected from the group consisting of nickel, tin, zinc, gold, alloys thereof, and combinations thereof.

15. The heat-exchange apparatus of claim 13, wherein the first metal composition comprises a copper alloy.

* * * * *